United States Patent [19]

Hammele et al.

[11] 4,217,763
[45] Aug. 19, 1980

[54] ASYNCHRONOUS MOTOR-DRIVEN MACHINE HAVING VARIABLE TORQUE DEMAND, SUCH AS HOUSEHOLD REFRIGERATOR COMPRESSORS

[75] Inventors: Karl Hammele; Henno Schotten, both of Giengen, Fed. Rep. of Germany

[73] Assignee: Bosch-Siemens Hausgeräte GmbH, Stuttgart, Fed. Rep. of Germany

[21] Appl. No.: 786,383

[22] Filed: Apr. 11, 1977

[30] Foreign Application Priority Data

Apr. 10, 1976 [DE] Fed. Rep. of Germany ....... 2615768

[51] Int. Cl.² ...................... F25B 31/00; H02K 17/02
[52] U.S. Cl. ........................................ 62/227; 62/228; 318/806
[58] Field of Search ............... 318/227, 230, 806, 812, 318/732, 798; 62/227, 229, 228; 417/45

[56] References Cited

U.S. PATENT DOCUMENTS 4,093,899  6/1978  Denny ............................ 318/806 X

OTHER PUBLICATIONS

Kovacks, Operating Behavior of Asynchronous Motors, 1957, Veb-Verlag Technik, Berlin.

*Primary Examiner*—William E. Wayner
*Attorney, Agent, or Firm*—Herbert L. Lerner

[57] ABSTRACT

In an assembly of a work-performing machine having variable torque demand driven by an asynchronous motor, a phase-angle control device for varying the operating voltage of the asynchronous motor in accordance with the respectively required torque, the asynchronous motor being operable with substantially optimal efficiency, by means of said phase angle control device, with the operating voltage matched to the respectively required torque.

2 Claims, 5 Drawing Figures

ASYNCHRONOUS MOTOR-DRIVEN MACHINE HAVING VARIABLE TORQUE DEMAND, SUCH AS HOUSEHOLD REFRIGERATOR COMPRESSORS

The invention relates to a work-performing maching having variable torque demand that is driven by an asynchronous motor, and more particularly to a compressor for refrigeration units of household refrigerators or the like.

It has been known heretofore to provide asynchronous motors for driving encapsulated or sealed compressors for refrigeration unit of household refrigerators with a device for phase-angle control. The purpose of this heretofore known phase-angle control device, however, is merely to enable motors of the same type and the same characteristics to be used safely and economically in an extended voltage range e.g. between 220 and 250 V, and to avoid an undesirable multiplicity of types in this manner. With this device for phase-gating control, the dangers to which such motors, that are usually designed only for narrow voltage tolerances, are exposed in operation to excess or under-voltage, are also avoided. It is an object of the invention of the instant application, however, to adapt the energy consumption of the asynchronous motor, in the case of a work-performing machine with varying torque demand which is driven by the asynchronous motor, in a simple manner to the varying torque demand, so as to limit thereby the energy consumption and consequently lower the operating costs.

With the foregoing and other objects in view, there is provided, in accordance with the invention, in an assembly of a work-performing machine having variable torque demand driven by an asynchronous motor, a phase-gating control device for varying the operating effecture or root mean square (r.m.s.) voltage of the asynchronous motor in accordance with the respectively required torque, the asynchronous motor being operable with substantially optimal efficiency, by means of the phase-gating control device, with the operating voltage matched to the respectively required torque.

The invention of the instant application is based on the realization that it is possible, in the face of varying torque demand of the work-performing machine, to operate an asynchronous motor equipped with phase angle control or phase angle gating control with optimum efficiency by controlling the phase angle gating according to the actual torque demand and the "quasi"- voltage change resulting therefrom, so that, for each torque taken-off at the motor shaft, that voltage corresponds at which the electric power of the drive motor consumed is a minimum and, therefore, the efficiency thereof is a maximum.

By means of the phase angle gating adapted to the respectively required torque, in accordance with the invention, and of the thereby reducible energy supply for the asynchronous motor, it is possible not only to control the energy supply almost without losses but also to reduce considerably the costs for operating the work-performing machine driven thereby. The greater efficiency obtained in this manner is noted particularly in the case of such work-performing machines which, like compressors for refrigeration units in household refrigerators, have a torque demand that varies especially greatly due to the intermittent operation of such work-performing machines.

In accordance with another feature of the invention, the phase angle control device includes means for varying the operating voltage of the asynchronous motor as a function of physical variables of the working machine, which vary as a function of the torque.

With such a device for phase angle control, completely automatic accommodation or matching to optimal operating conditions of the asynchronous motor can be achieved in a simple manner by a readily determinable system variable and energy can be saved in an especially reliable manner.

In refrigeration units for household refrigerators, the conditions for automatic accommodation or matching of the phase angle control are exceptionally good through the temperature and pressure changes that occur during the operation. Consequently, in accordance with particularly advantageous alternate features of the invention, there is provided in these refrigeration units that the phase angle control device has means for varying the operating voltage of the asynchronous motor as a function of the instantaneous evaporator temperature or as a function of the respective backpressure prevailing at the compressor of the refrigeration unit.

Other features which are considered as characteristic for the invention are set forth in the appended claims.

Although the invention is illustrated and described herein as embodied in an asynchronous motor-driven machine having variable torque demand, such as household refrigerator compressors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
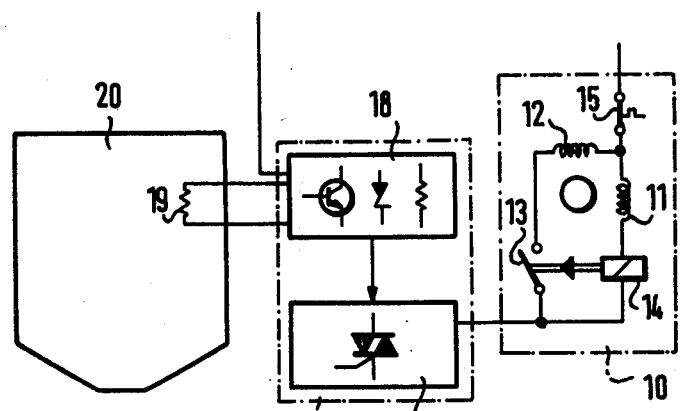
FIG. 1 is a simplified circuit diagram of an asynchronous motor for driving a refrigeration unit for a household refrigerator with a phase angle control shown as a block diagram and influenced or controlled by the temperature of the evaporator of the refrigeration unit.
Figure 1A:
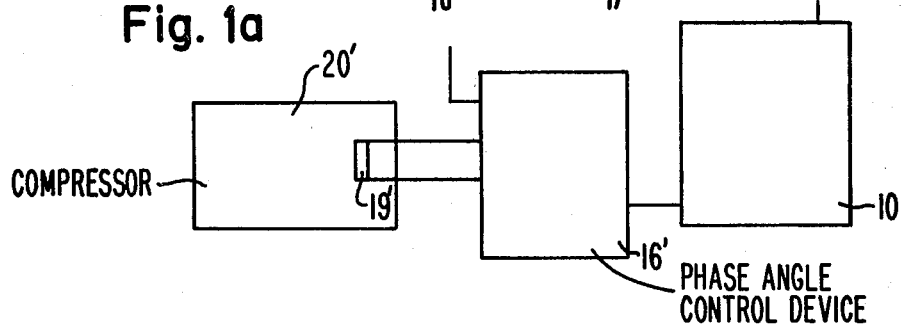

Referring now to the drawing and first, particularly, to FIG. 1 thereof, there is shown an asynchronous motor 10 equipped in conventional manner with a main winding 11 and an auxiliary winding 12 connected in shunt thereto. A switch 13 is connected into the line branch of the auxiliary winding 12 parallel to the main winding 11, and is operable by means of a relay 14 connected into the circuit of the main winding 11, and applies a voltage to the auxiliary winding 12 as a function of the current drain of the main winding 11, or shuts it off. The asynchronous motor 10 is further equipped with an overload switch 15, which is constructed as a thermal switch.

The non-illustrated refrigeration unit of a household refrigerator driven by the asynchronous motor 10 is controlled in conventional manner by a conventional regulator or control, also not shown, which switches the circuit of the asynchronous motor 10 intermittently as a function of the temperature prevailing in the refrigerator. As a further control member, a device for phase angle control 16 is connected into the circuit of the asynchronous motor 10. This phase angle control device 16, shown in the form of a block diagram in the illustration of the embodiment of the invention in FIG. 1, comprises an electronic adjusting member which, as shown, is constructed as a Triac.

The adjusting member 17 is controlled by a conventional electronic device 18 which influences the firing time of the Triac as a function of the temperature of the evaporator of the refrigerator. For this purpose, the electronic device 18 is equipped with a temperature sensor 19 which rests in good heat-conducting contact against an evaporator 20 in the refrigerator and influences in a conventional manner, by means of a resistance change in a bridge circuit or the like, the firing instant of the electronic control or adjusting member 17.

Figure 2:
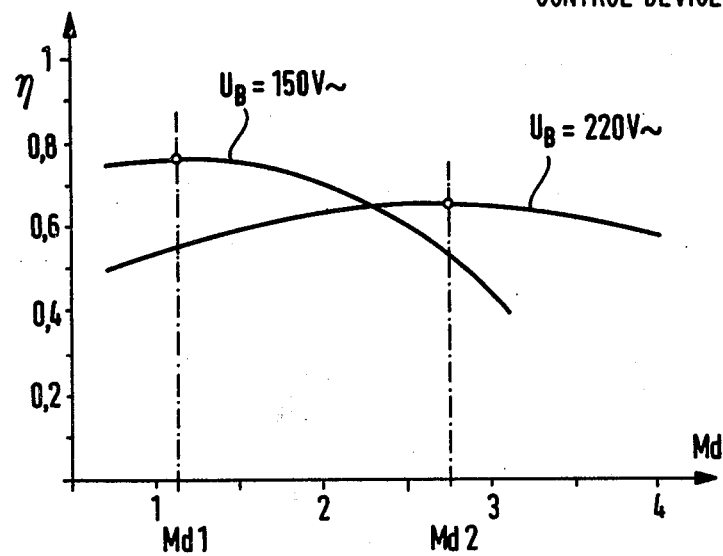
FIG. 2 is a plot diagram illustrating the change of the efficiency ordinate of an asynchronous motor as a function of the delivered torque abscissa, with the operating voltage as parameter.

The curves shown in the plot diagram of FIG. 2 are obtained if, for an asynchronous motor operated with constant voltage, the efficiency $\eta$ is plotted against the delivered torque Md. It is evident therefrom that the efficiency passes through a maximum as the torque Md varies. This maximum efficiency is at an operating r.m.s. voltage of 150 V for a torque Md 1 and at an operating r.m.s. voltage of 220 V for a torque Md 2. Conversely, it is seen therefrom that there is, for every torque delivered at the motor shaft, an r.m.s. voltage at which the consumed electric power is a minimum and thus, the efficiency $\eta$ of the asynchronous motor reaches a maximum.

For motors used in refrigeration units of household refrigerators, the optimum efficiency is at about one-half the breakdown or stalling torque. In normal operation, the motor runs more-or-less removed or distant from this operating point. In the plot diagrams according to FIGS. 3, 4 and 5, the relationship between the rotary speed-torque characteristic curves and the phase angle control of the r.m.s. voltage is shown. Driving the asynchronous motor with a voltage, in which the phase angle is gated-on, for example, at 90°, acts like driving with a lower voltage. The asynchronous motor then runs with the least torque and with optimal efficiency. By appropriately slaving the electronic device 18, which determines the firing instant of the electronic control or adjusting member 17, to the temperature determined by the temperature sensor 19, the herinaforedescribed assembly makes it possible to operate the asynchronous motor 10 always at optimum efficiency. The temperature of the evaporator can serve as the nominal variable for obtaining the control signal in accordance with the embodiment of the invention illustrated in FIG. 1, because the temperature of the evaporator is, in a first approximation, directly proportional to the torque to be supplied by the asynchronous motor 10. In such refrigeration machines, the evaporation temperature is essentially dependent upon the pressure difference between the suction and the pressure side. As the pressure at the suction side lessens, the boiling point of the liquid coolant in the evaporator becomes lower and thereby obviously the temperature of the evaporator becomes lower as well. Assuming that such a compression-refrigeration machine is turned on after a long period of non-use, and that during this time, pressure has equalized between the suction and pressure side, then consequently a large volume of refrigerant will be sucted in with each suction stroke of the piston compressor when operation is resumed. Naturally, a correspondingly large torque will be required to condense this large refrigerant volume. However, shortly after starting-up the compressor, the pressure at the suction side decreases. Thus, the volume of the sucked in refrigerant also decreases. From this it follows that as the refrigeration machine runs longer, the pressure at the suction side decreases, and thereby its torque requirement also gets smaller. In this way, an almost directly proportional relationship results between the temperature of the evaporator and the torque of the drive motor for operating the refrigeration machine.

Figure 3:
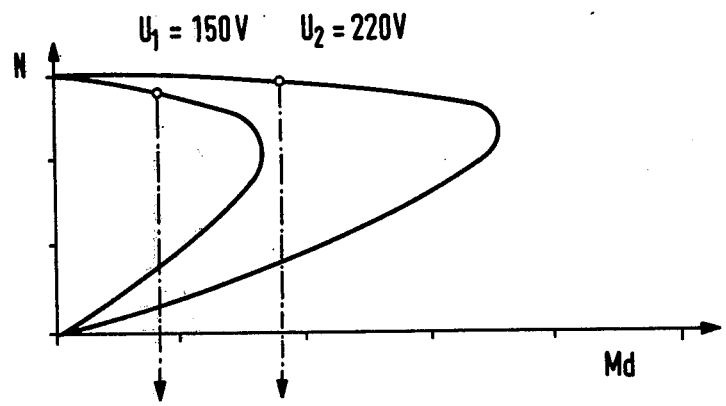
FIG. 3 is a plot diagram, from which the course of the torque abscissa for varying rotary speeds (ordinate) can be seen, also with the operating voltage as parameter.

From the two curves shown in FIG. 3, the relationships between the number of revolutions N and the torque Md of an asynchronous motor 10 can be seen. In the example represented by the outer curve, the motor is operated at a voltage $U_2 = 220$ V and in the example represented by the inner curve, the motor is operated at a voltage of $U_1 = 150$V. As can be seen from these curves, the torque varies approximately proportionally to the applied voltage. For voltage values between $U_1$ and $U_2$, the corresponding curves are in the region limited by the two curves shown.

If, for example, an asynchronous motor for driving a work-performing machine having varying torque requirements is driven at a constant voltage of $U_2 = 220$ V, the instantaneous operating point, according to the measure of the torque of this moment, moves back and forth on the upper branch of the outer curve. However, because asynchronous motors for cooling plants of household refrigerators generally only operate with optimal efficiency if the torque, as indicated by the dotted line on the right side of FIG. 3, lies approximately in the middle of the upper branch of the curve, moving the instantaneous operating point from the middle of the upper branch to the left for decreasing torque requirement, results in the asynchronous motor working at non-optimal efficiency. Nevertheless, by varying the operating voltage, and by varying the effective voltage value, one can work on the curve for which the instantaneously required torque lies in the middle of the upper branch of the curve, and for which the degree of effectiveness of the asynchronous motor is optimal. The dotted line on the left side of FIG. 3, represents the case for a voltage of $U_1 = 150$ V. Naturally, a special voltage at which the asynchronous motor is driven most effectively, corresponds to each torque required during the operation of the work-performing machine. Therefore, in order to achieve operation with optimal efficiency, it is necessary to adjust the voltage to the respective torque requirement.

Figure 4:
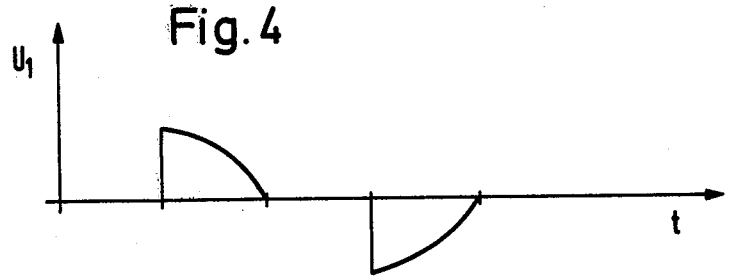
FIGS. 4 and 5 are respective plot diagrams illustrating the operation of phase angle gating, with the respective operational voltages plotted against time.
Figure 5:
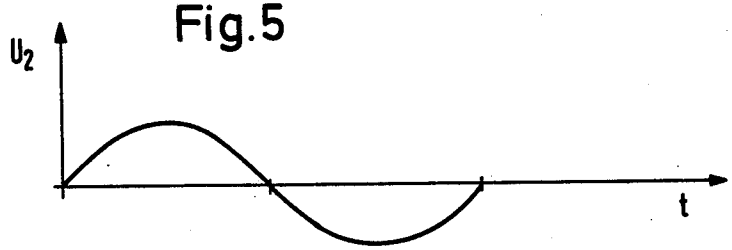

However, according to the invention of the instant application, the applied voltage is controlled by electronic means 18, which affect the firing point of a Triac 17, and thereby the effective value of the voltage in such a manner that the optimal effectiveness of the asynchronous motor 10 is always guaranteed during the complete operating time, including times having varying torque demands. The two diagrams of FIGS. 4 and 5 merely show a representation of an alternating current period wherein FIG. 5 corresponds to the full voltage, and FIG. 4 is cut off at a phase angle of approximately 90°, and is therefore reduced to an effective voltage $U_1 = 150$ V.

In the electronic circuitry for obtaining the firiing signal for the appropriate firing instant of the Triac serving as the electronic control or adjusting member 17, the line voltage must, of course, also be taken into consideration, so that the asynchronous motor 10 is always driven with a voltage which depends only upon the prevailing or then existent torque demand of the refrigeration unit.

In a refrigeration unit operated with the hereinafore described device for phase angle gating control of the asynchronous motor 10, between 10% and 30% of the total energy consumed by corresponding presently conventional refrigeration units can be saved.

We claim:

1. In an assembly of a work-performing machine having variable torque demand driven by an asynchronous motor, a phase-angle control device for varying the operating r.m.s. voltage of the asynchronous motor in accordance with the respectively required torque, the asynchronous motor being operable with substantially optimal efficiency, by means of said phase angle control device, with the operating r.m.s. voltage matched to the respectively required torque, the work-performing machine being a compressor for a refrigeration unit of a household refridegerator including an evaporator, and said means for varying the operating r.m.s. voltage of the asynchronous motor for varying the torque demanded by the work-performing machine being effective in accordance with the respective temperature of the evaporator of the refrigeration unit.

2. In an assembly of a work-performing machine having variable torque demand driven by an asynchronous motor, a phase-angle control device for varying the operating r.m.s. voltage of asynchronous motor in accordance with the respectively required torque, the asynchronous motor being operable with substantially optimal efficiency, by means of said phase angle control device, with the operating r.m.s. voltage matched to the respectively required torque, said phase angle control device including means for varying the operating r.m.s. voltage of the asynchronous motor as a function of physical system variables of the work-performing machine, the work-performing machine being a compressor for a refrigeration unit of a household refrigerator, and said means for varying the operating r.m.s. voltage of the asynchronous motor being effective in accordance with respective backpressure prevailing at the compressor for the refrigeration unit.

* * * * *